Nov. 9, 1954  G. M. MAST ET AL  2,693,643
ANGLE MEASURING INSTRUMENT

Filed May 25, 1953  2 Sheets-Sheet 1

INVENTORS
GIFFORD M. MAST
WRIGHT K. GANNETT &
WESLEY A. TAYLOR
BY *Merrill M. Blackburn*
ATTORNEY Nov. 9, 1954   G. M. MAST ET AL   2,693,643
ANGLE MEASURING INSTRUMENT
Filed May 25, 1953                              2 Sheets-Sheet 2

READ: 269°-57½'
TRANSFER AT TENS

READ: 268°-57½'
TRANSFER AT INTEGRAL

READ: 268°-11'

INVENTORS
GIFFORD M. MAST
WRIGHT K. GANNETT &
WESLEY A. TAYLOR
BY Merrill M. Blackburn
ATTORNEY

United States Patent Office 2,693,643
Patented Nov. 9, 1954

2,693,643

ANGLE MEASURING INSTRUMENT

Gifford M. Mast, Davenport, and Wright K. Gannett and Wesley A. Taylor, near Davenport, Iowa Application May 25, 1953, Serial No. 357,004

6 Claims. (Cl. 33—1)

The present invention relates to measuring instruments and is particularly concerned with instruments for measuring angles, such as those used for measuring the azimuth angle between two objects, one of which, for example, may be an arbitrary zero angle datum line.

Among the objects of this invention is the provision of new and improved means to provide a direct-reading device for indicating the horizontal angle between two objects or points, and more specifically it is an important feature of this invention to provide a direct reading mechanism that is capable of rapid movement without the development of objectional inertia forces in the gearing.

A further important feature of this invention is the provision of a measuring instrument having intermeshing gears for actuating a dial, register wheel, or the like, with which is incorporated a correcting mechanism for varying the ratio, in order to compensate for inaccuracies in the formation of the gear teeth and/or other parts, whereby, at any point in the range of the device, ratio of motion transmission remains constant.

It is also an important feature of this invention to provide a compensating means in the motion transmitting and multiplying gearing, which means includes a differential part and a cam connected therewith to shift said part in one direction or the other and thus momentarily speed up or slow down the transmitted motion, at such points in the cycle of operation as are required to compensate for gear inaccuracies and the like.

In the drawings annexed hereto and forming a part hereof,

The angle measuring mechanism of the present invention is illustrated as incorporated in an instrument which includes a casing or housing 10 mounted for rotation about a vertical axis by any suitable means, such as by being connected to a base member 11 carrying leveling screws and supported on a tripod head, not shown, of conventional construction, the housing 10 being rotatable relative to the base member 11. The casing or housing 10 has an optical sight device 14 of any suitable construction, such as one in which a reticle pattern is projected in collimated light against an observed background. Once an arbitrary zero angle datum line, such as true north, has been established, the azimuth angle of the object or point to be measured is indicated directly by a plurality of dials or indicating drums, graduated in degrees and minutes of an arc, for example. The sighting apparatus is a standard Navy No. 9 sight with a light collimating attachment.

Figure 6:
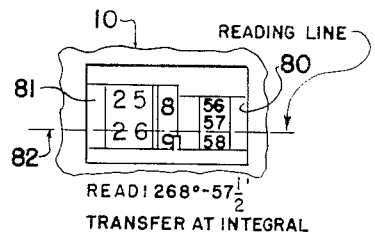
Figure 7:
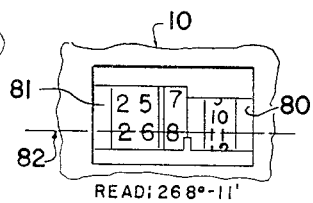

The present invention is primarily concerned with the mechanism by which the indicating drums or wheels are driven at the proper ratio in response to movement of the casing or housing 10 in azimuth about a vertical axis. Referring now to Fig. 6, connected fixedly in any suitable manner to the tripod base member 11 is a large worm gear 16 affixed to a shaft 17 which, in turn, is affixed at its lower end to the tripod base member 11. Also affixed to the shaft 17, below the gear 16 is a cam member 18, to which detailed reference will be made hereinafter.

The housing 10 supports a horizontal shaft 21, on the inner end of which is affixed a worm pinion 22 which meshes with the worm gear 16. A spur pinion 24 is affixed to the shaft 21 and rotates at all times therewith. The spur pinion 24 is an elongated member and, at its outer end, it carries a split gear section 25. The worm gear 16 and worm pinion 22 are cut as accurately as possible, whereby to reduce the cumulative lead error. Positioned in spaced relation from the shaft 21 is a second shaft 27 which also has bearing support in the housing 10, as by a pair of supporting plates 28 and 29. An actuating crank wheel 32 is affixed to the outer end of the shaft 27, and to the inner end of the latter is affixed a large gear 33 which meshes with the inner portion of the elongated spur pinion 24. Since no measurement of angles is taken from the gear 33 there is no need for high angular accuracy between the gear 33 and the spur pinion 24. The gearing parts 16, 22 and 33, 24 are so arranged, ratiowise, that one revolution of the hand wheel 32 produces a movement of the housing 10, and of the line of sight device 14 of movement about the axis 17 carried thereby, of five degrees (5°) of arc of movement about the axis 17, but this, of course, may vary.

Figure 2:
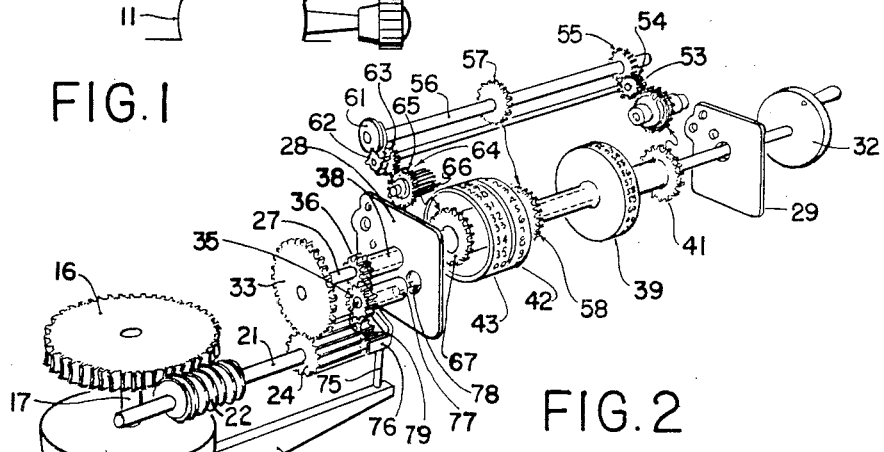
Fig. 2 is an exploded view of the main components of the gearing that drives the direct-reading dials or indicating drums or wheels.
Figure 3:
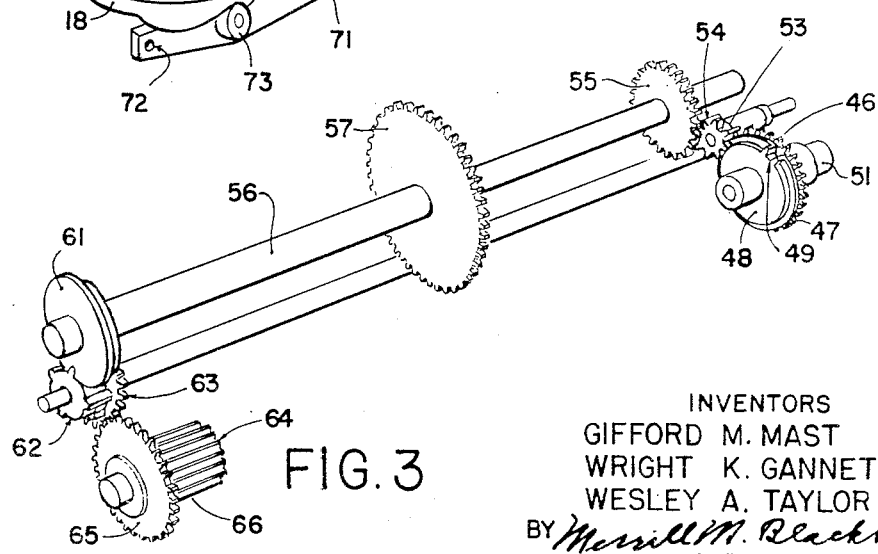
Fig. 3 is an enlarged perspective exploded view, showing the major portion of the dial-advancing mechanism.
Figure 4:
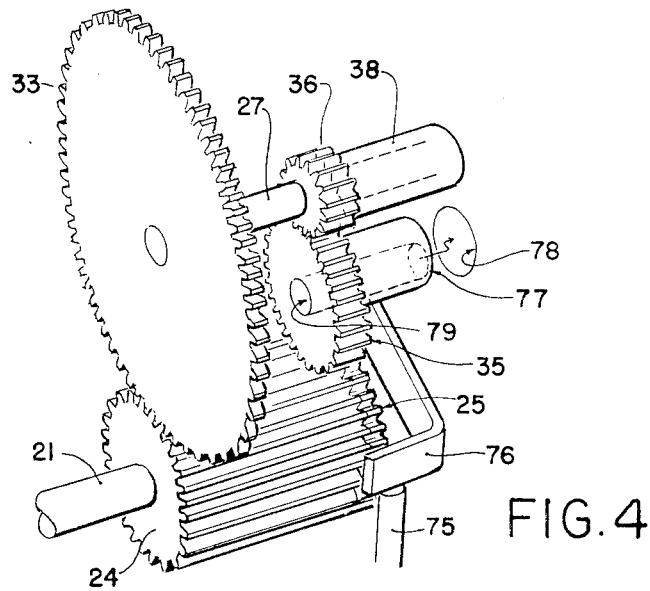
Fig. 4 is an enlarged perspective view of a portion of the automatic compensating mechanism.
Figure 5:
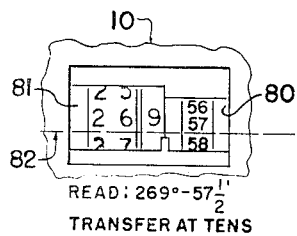
Figs. 5, 6 and 7 are diagrammatic views illustrating the reading of the dials.

To provide a direct-reading measurement of the arc through which the casing is turned in any one observation, an indicator drive is taken off the gear or spur pinion 24, as by an idler gear 35 which meshes with the split gear section 25 and the adjacent portion of the spur pinion 24. The only purpose of the split gear section 25 is to provide zero backlash between the spur pinion 24 and the idler gear 35. The idler gear 35 meshes with a pinion 36 which is affixed to the inner end of a tubular shaft 38 carried for free rotation on the shaft 27. At the outer end of the tubular shaft 38 are carried an indicator drum or wheel 39 and a gear 41 which are affixed to the tubular shaft 38. It will be understood that in Fig. 2 the shafts 27 and 38 are shown somewhat elongated, as compared with their actual length, due to the exploded nature of the showing in Fig. 2. The indicator wheel 39 is graduated on its periphery with sixty numbers, as 0 to 59, inclusive, spaced apart at six degrees (6°) intervals on the periphery of the wheel. The indicator wheel 39 rotates continuously with the spur pinion 24 and the horizontal shaft 21.

Figure 8:
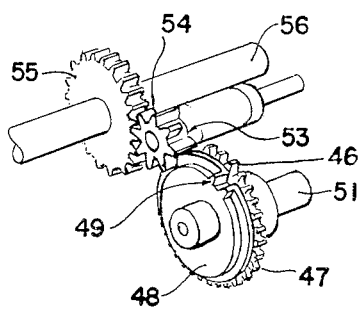
Fig. 8 is a perspective view of a portion of the transfer mechanism.

Also mounted for relative free rotation on the tubular shaft 27 are two indicator wheels or dials 42 and 43. The periphery of the indicator wheel 42 is provided with three sets of numbers, reading from 0 to 9, inclusive, making thirty numbers in all. The indicator wheel 43 is of the same diameter as the wheel 42 but the drum section or periphery is wider, bearing equally spaced apart numbers from 1 through 35, and then, in addition, 00. The indicator wheel 39 can be referred to as the minute wheel; the wheel 42, as the unit degree wheel; and the wheel 43, as the tens degree wheel. As will be readily understood, these counter or indicator wheels 39, 42, and 43 are arranged in side by side relation, as shown in Figs. 8, 9, and 10, and will read from 000° 00' to 359° 59', inclusive.

As mentioned above, the minute wheel 39 is affixed to the shaft 38 and turns continuously therewith, but the wheels 42 and 43 are free on the shaft. In order, therefore, to advance the wheels 42 and 43 at the proper intervals, a new and improved indexing or transfer mechanism has to be provided. The outer end of the tubular shaft 38 fixedly carries the gear 41 that meshes with a spur gear section 46 of a compound gear member 47, which also includes a two-tooth intermittent gear section 48, the two teeth of which are indicated at 49. The gear member 47 is supported for rotation on a stub shaft 51 carried by the laterally outer bearing plate 29. The two-tooth intermittent gear section 48 meshes with an intermittent four-tooth gear section 53 to which is affixed a pinion 54. The latter meshes with a gear 55 which is affixed to a counter shaft 56, also carried by the bearing plates 28 and 29. The gear ratios provided by the above described members are as follows: One turn of the two-tooth intermittent gear section 48 advances the four-tooth intermittent gear section 53 one quarter turn, the gear 53 being held against rotation at all times that the two teeth 49 are out of contact with the teeth on the gear 53. Each time the teeth 49 of the gear member 47 pass the gear section 53, the latter is advanced one quarter of a revolution and, as a consequence thereof, the pinion 54, an eight-tooth gear, is advanced two teeth, which in turn advances the gear 55 two teeth. A gear 57 is affixed to the counter shaft 56 and meshes with a gear 58 which is affixed to or forming a part of the units degree wheel 42, whereby an angular rotation of the shaft 56, corresponding to a two tooth displacement of the gear 55, advances the unit degree wheel 42 from one number to the next, or, in the illustrative form shown in the drawings, through one thirtieth of a revolution, or twelve degrees (12°). Thus, at each complete revolution of the minute wheel 39, the tens degree wheel 42 is advanced an amount indicated as one degree (1°).

In conventional intermittent mechanism of this general character, the indexing or transfer takes place only when the minute wheel moves from its fifty-nine minutes (59') position to its zero minute (0') position but, as will be referred to in detail hereinafter, according to the present invention, the advance of the tens degree wheel is made to take place through an extent of movement of the minute wheel which corresponds to several numbers, as during a movement from fifty-five minutes (55') through fifty-nine minutes (59'), so that a very rapid traverse of the instrument is accommodated without creating excessively high stresses due to inertia of parts, the movements of which are suddenly stopped or started.

Mechanism substantially like that described above for intermittently advancing the degree wheel 42 at each revolution of the minute wheel 39 is, according to the present invention, provided for advancing the tens degree wheel 43 one step, representing an indicated ten degree (10°) advance for each third of a revolution of the units degree wheel 42. To this end, index or transfer mechanism, acting between the counter shaft 56 and the counter wheel 43, is provided, and will now be described.

An intermittent gear 61, which may be substantially identical with the intermittent gear section 48, described above, is affixed to the inner end of the counter shaft 56 and actuates a companion intermittent gear 62 having, as illustrated, four teeth and a spur gear section 63 which meshes with a compound reduction gear member 64 having a first gear section 65 driven from the gear section 62 and a pinion section 66 affixed to the section 65 and meshing with a gear 67 which is affixed to the tens degree wheel 43. At each revolution of the counter shaft 56, the intermittent gear 62 is advanced one quarter of a revolution, and the gear ratios are such that, at any actuation of the tens degree transfer mechanism, the counter wheel is advanced from one number to the next, which corresponds to one-thirty-sixth (1/36) of a revolution.

The operation of the construction of the present invention as already described is substantially as follows:

By suitable manipulation of the transit head controls, the horizontal gear 16 may be unlocked and the latter, with the instrument swung in azimuth until the line of sight of the instrument is aligned with or set corresponding to an arbitrary zero angle datum line, the crank 32 having been previously turned to bring all of the counter wheels to zero reading, namely, no degrees, no minutes (000°, 00'). The gear 16 is then locked to the transit head and thereafter remains fixed. Assume, for example, that the instrument is to be used to angularly locate an object, such as a bomb burst, in azimuth referred to said zero angle datum line.

Figure 1:
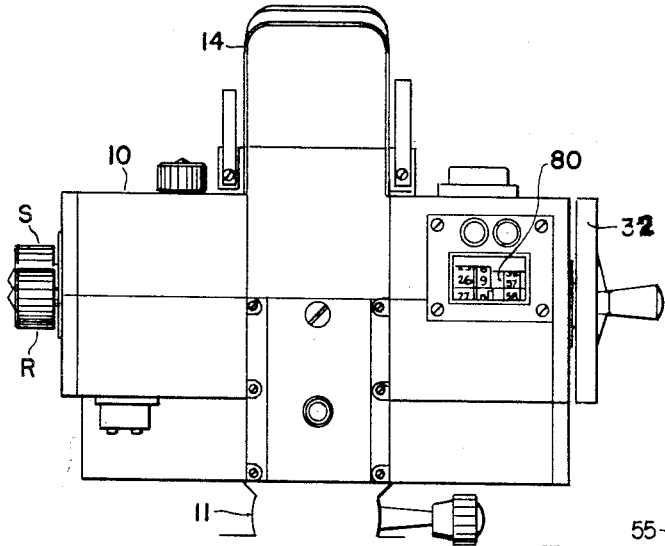
Fig. 1 is a front view, in which position the direct reading dials are accessible.

This instrument carries suitable lamp means and a suitable source of electrical power, such as a battery or a transformer, or a plurality of them, which may be controlled by a switch S, as shown in Fig. 1, and a rheostat R. The reticle pattern, a bright vertical line, is seen projected in collimated light against the background, and the instrument is then turned, as by rotating the crank wheel 32, until the bright line is centered on the bomb burst. The azimuth angle through which the instrument is turned is then indicated directly by the counter wheels 39, 42, and 43, and by virtue of the direct reading characteristic of this type of instrument, personnel having but little training are enabled to make accurate observations without the danger of misreading that is always present when using the difficult-to-read verniers found on the usual transit instruments, and others of this type.

The parts, including gear ratios, are so arranged that each revolution of the crank 32 produces a five degree (5°) advance in azimuth of the instrument and, to produce a satisfactory rate of traverse, the crank 32 and associated parts must be capable of operating at such a speed as one that corresponds to one turn of the crank 32 per second. The counter wheel or minute wheel 39 is thus rotated five times per second. Reference has been made herebefore to the feature of this invention wherein the transfer or indexing of the unit degree wheel 42 from the rotation of the shaft 38 carrying the minute wheel 39 takes place, not just when the minute wheel 39 moves from its fifty-nine minutes (59') position to its zero minutes (00') position, which would require a transfer at a rate that would equal five times sixty (5×60), or three hundred (300) per second, at the above indicated advance of five degrees (5°) per second, but the transfer, according to this invention, can take place during a period which corresponds to a movement of the minute wheel 39 from, for example, fifty-five minutes (55') through zero minutes (00'), which is a period several times as long as the one-three hundredths (1/300) of a second, mentioned above. Thus, intermittent gears 53–55 and associated parts, which would otherwise have to be started and stopped, with substantially maximum acceleration and deceleration, within the one-three hundredths (1/300) of a second, may now have substantially five times that period, or one-sixtieth (1/60) of a second, in which to be started and stopped. In this way, stresses and strains, which vary substantially as the square of the velocity, in the intermittently actuated parts are materially reduced, and these parts can be made sufficiently strong and sturdy to produce a long lived instrument. Since the rate of transfer or indexing of the tens degree wheel 43 is at a much slower rate than the intermittent advance of the units degree wheel 42, the indexing or advance of the tens degree wheel 43 can be performed while the units degree wheel 42 moves from 9 to 0.

Since one degree of movement relative to the large gear 16 corresponds to a complete revolution of the minute wheel 39, with its sixty direct-reading divisions or indicia thereon, it will be appreciated that accuracy of gear cutting is essential, particularly between the gears 16 and 22. As a practical proposition, it is difficult to cut a worm wheel, such as 16, with near zero cumulative circular pitch error, when measured in terms of minutes of azimuth. In order to compensate for errors in the gearing 16, 22, there is provided, according to the principles of this invention, an empirically cut cam 18. This cam is affixed to the shaft 17 and remains in constant relation with respect to the gear 16.

The casing or housing 10 carries a cam follower lever 71 which is pivoted at 72 on the housing and carries a cam-engaging roller 73. The outer end of the lever 71 carries a stud 75, or other suitable means, which is engaged with and serves to position an arm 76 which is affixed to an eccentric bushing 77. The latter is supported for rocking motion in an opening 78 in the adjacent supporting plate 28, and this bushing 77 carries a shaft 79 on which the idler gear 35 is journaled.

Movement of the arm 76, through small angles in either direction from a normal or generally central position, turns the eccentric bushing 77 and thereby shifts the shaft 79 laterally in relation to the line of centers of the shafts 21 and 27. This lateral motion of the shaft 79 acts to roll the idler gear 35 around the gears 24, 25 which thus feeds a differential angle of rotation into the counter by way of the pinion 36. The latter, like the gears 24, 25, is a two-section or split gear and takes out all back lash. Further, the pinion 36 and gears 24, 25 absorb any component of motion of the idler gear 35 along the line of centers of the shafts 21 and 27, or the pinion 36 and the gears 24, 25.

By virtue of the mechanism just described, which changes the motion transmission ratio, any inaccuracies in the gears 16 and 22 may be compensated by properly forming the cam 18 and, by the action of the latter and associated parts, the minute wheel 39 may be rotated at a constant ratio, such as 1 to 21,600 (60×360). Thus the arm 76 is actuated by the cam 18 to feed a differential angle of rotation into the counter to cause the latter to read correctly, despite the fact that the worm wheel 16, or the worm 22, might be inaccurately cut.

As best shown in Figs. 6 and 8 to 10, the casing or housing 10 is provided with an opening through which the dials or counter wheels 39, 42, and 43 are visible. The opening 80 is enlarged, as shown at 81, to make it possible to see two rows of numbers on the degree wheels 42 and 43. As mentioned above, the indexing or transfer mechanism is arranged so that during the interval from 55 minutes to 60, or 00, minutes, degree member 42 is moving from one number to the next. As shown, this advance occurs by movement of a number, and the casing carries a reading line 82, from the lower row to the upper row, as shown in Fig. 9. Hence, the degree number above the reading line is read. The minute wheel has the numerals 55 through 59 colored to signal this action. Similarly, when both the units and tens degree wheels are being indexed or transferred, as shown in Fig. 8, the degree reading above the reading line is read. To signal this action, each of the numerals 9 on the units degree wheel is colored.

The counter wheel 39, indicating minutes of arc, is affixed to the tubular shaft 38 and, hence, rotates continuously. If desired, however, this wheel and its gear 45 could be loosely mounted on the shaft 38 and suitable transfer mechanism provided to make the counter wheel 39 index. At a rate of traverse of five degrees (5°) per second, this would require 300 transfers per minute. Preferably a Geneva type of transfer with its favorable acceleration and deceleration characteristics is used to accommodate the extremely rapid starting and stopping entailed in such a high rate of transfer.

The head of the present angle measuring instrument resembles the head of a transit-compass in which the telescope is replaced by a reflex sight. In the present instrument, the vertical adjustment is not gross, but very fine, not being in excess of twenty seconds, and the specific description of the structure and method of use of this invention is disclosed in the present specification and defined by the appended claims.

Having now described our invention, we claim:

1. An angle-measuring instrument for indicating the angular displacement of a first part relative to a second part, comprising a gear affixed to said second part, a member meshing with said gear and rotatably mounted in said first part, means for rotating said member, including a shaft, a crank on the outer end of said shaft, a tubular shaft mounted for rotation on said first shaft, means drivingly connecting said tubular shaft with said first mentioned member, a counter wheel affixed to said tubular shaft, one or more counter wheels rotatable on said tubular shaft, and intermittent gearing operatively connecting said tubular shaft with said second mentioned counter wheels.

2. An angle-measuring instrument as defined by claim 1, further characterized by said intermittent gearing including a Geneva drive.

3. In an angle-measuring instrument, a relatively fixed gear member, a casing carrying counter wheels and rotatable about the axis of said gear member, means acting between said casing and said gear member for actuating said counter wheels in response to rotation of said casing relative to said gear member, said actuating means including motion transmission ratio changing means, a cam carried in fixed relation to said gear member, a part carried by said casing and movable along said cam member as the casing is turned relative to said gear member, and means connecting said part with said ratio-changing means.

4. In an angle-measuring instrument, a pair of relatively rotatable members, the angle of relative movement of which it is desired to measure, a gear affixed to one of said members, a shaft carried by the other member, means carried by said shaft and meshing with said gear, a second shaft carried by said other member, a pair of gears carried by said shafts and intermeshing, whereby rotation of said second shaft serves to drive said first shaft and to act through said first gear to produce relative angular movement between said members, means for rotating said second shaft, a tubular shaft carried by said second shaft and having a connection with said first shaft which is independent of the connection between said intermeshing gears, a direct reading dial carried by said tubular shaft, other direct reading dials rotatably carried by said tubular shaft, and intermittent gearing connecting said other dials with said tubular shaft to be rotated thereby.

5. In an angle-measuring instrument, a pair of relatively angularly movable parts, the angle between which it is desired to measure, a gear member connected with one of said parts, a second gear member meshing with said first gear member, means for rotating said second gear member, including a third gear member rotatable about an axis, a set of interconnected direct-reading dials adapted, when rotated, to indicate the angle between said parts, means for driving said set from said third gear, including a gear rotatable about an axis spaced from said first mentioned axis, an idler gear meshing with said last mentioned gear and with said third gear member, a shiftable support for said idler gear, and compensating mechanism connected with said support to shift the latter and said idler gear to vary the ratio of motion transmitted to said dial set by the rotation of said third gear member.

6. In an angle-measuring instrument as defined by claim 5, further characterized by said shiftable support comprising a bushing rotatably supported by the other of said parts, and a shaft supporting said idler gear, said shaft being positioned eccentrically with respect to the axis of rotation of said bushing.

References Cited in the file of this patent

UNITED STATES PATENTS

| Number | Name | Date |
|--------|------|------|
| 1,923,759 | Smith | Aug. 22, 1933 |
| 2,405,028 | Ford | July 30, 1946 |
| 2,463,594 | Brigham | Mar. 8, 1949 |
| 2,661,903 | Goldbach | Dec. 8, 1953 |